M. E. DEARING.
WATER HEATER AND STEAM BOILER.
APPLICATION FILED OCT. 11, 1916.
1,223,674.
Patented Apr. 24, 1917.
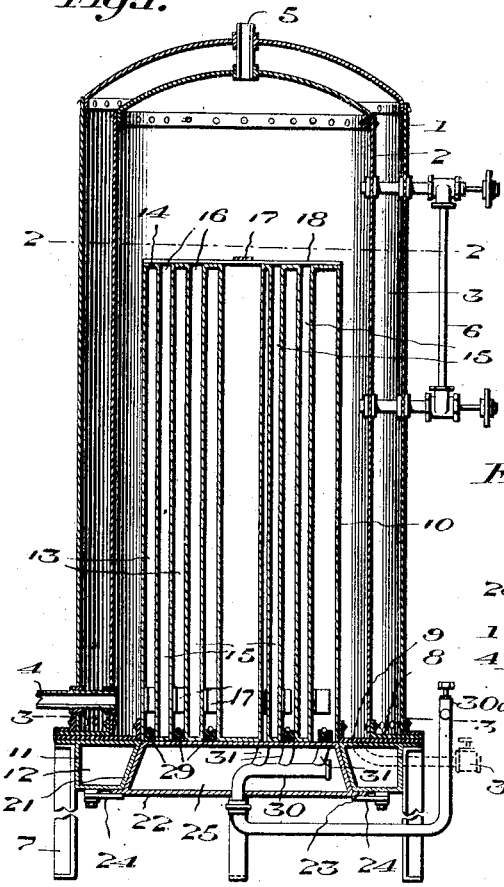
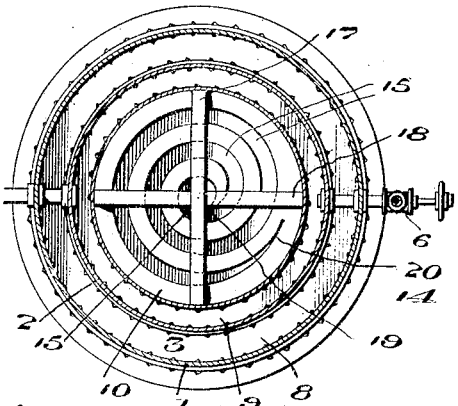
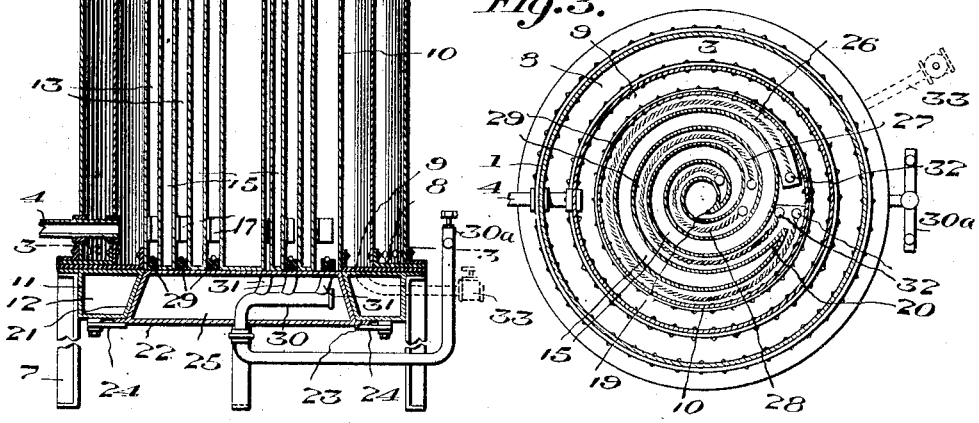
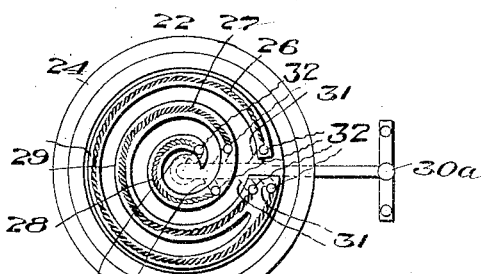
Witnesses
Antoinette B. Kinney.
Geo. E. Skelton.
Inventor
Major E. Dearing
by Geo. W. Hamlin
his Atty.

UNITED STATES PATENT OFFICE.

MAJOR E. DEARING, OF SALT LAKE CITY, UTAH.

WATER-HEATER AND STEAM-BOILER.

1,223,674.   Specification of Letters Patent.   Patented Apr. 24, 1917.

Application filed October 11, 1916. Serial No. 125,118.

*To all whom it may concern:*

Be it known that I, MAJOR E. DEARING, a citizen of the United States, residing at Salt Lake City, county of Salt Lake, and State of Utah, have invented certain new and useful Improvements in Water-Heaters and Steam - Boilers, of which the following is a specification.

This invention relates to water heaters and steam boilers of that general class wherein a heating chamber or chambers are immersed in the water contained within the shell and are internally heated by heat producing means.
My object is to provide an improved water heater and steam boiler of the general class set forth wherein a maximum heating effect is obtained by the exposure of a maximum heating surface to the water and the use of a minimum amount of heat whether generated electrically or produced by steam, gas, oil, gasolene, or other heat producing means.

A further object is the provision of a water heater and steam boiler, constructed in an improved manner whereby the water and the heat producing means are insulated from the external air to thereby minimize radiation and insure a maximum heating effect on the water by minimizing loss through radiation.

Another object is the provision of a water heater and boiler wherein the heating devices are self-contained with a hollow removable section coöperatively related to the heating cells or chambers in a novel manner, rendering it possible to place in position, or remove, the heating devices as an entirety.

My invention resides, still further, in a shell or hollow heating element of convolute form whereby the heat from any given part of the heating element or elements, device, or devices, has access to, and heats, the complete convolute heating device. This form of heating device also enables a maximum area to be in contact with the water and thereby obtains a maximum heating effect.

Another improvement provided by my invention is the disposition of the heating elements or means in the lower portion of the convolute heating device whereby the heat which rises from the heating elements or means, attains the full height of the hollow heating device and the maximum heating effect is thereby obtained.
The hollow convolute heater comprises alternate heating chambers or spaces and water spaces, the former being closed at their tops and the latter at their bottoms. The hollow attachable and removable section carries the heating elements or means in such arrangement or disposition that they enter or are exposed to the open lower ends of the heating chambers when said removable section is secured in position.

Preferably the heating elements or means comprise resistance coils carried by insulating material and attached to the removable section, with a trunk conduit and branches containing the leading in electric wires for the resistance elements, self-contained with and bodily carried by the removable section. However, in its broadest aspect the invention is not limited to the use of resistance coils or elements as the heating means, as I may provide means, carried by the removable section, for heating the convolute heating device by steam, gas, oil, gasolene, or other heat producing means.

The embodiment of the invention hereinafter described and shown in the accompanying drawings is to be considered as illustrative, rather than restrictive, of the scope thereof, as modifications may be resorted to within the principle of the invention.

In the accompanying drawings:

Figure 1 is a vertical section;

Fig. 2, a section on line 2—2 of Fig. 1;

Fig. 3, a section on line 3—3, of Fig. 1; and

Fig. 4, a detail top plan of the removable bottom section.

The inner and outer shells 1 and 2 are separated by a sealed space 3 which may contain dead air or be a vacuum. The water supply enters through pipe 4, under suitable valve control, and the hot water or steam, under suitable control, passes out through the outlet 5. The device may be used either as a water heater or a steam boiler according to whether it is fully, or only partially, filled with water. An ordinary gage glass 6 with suitable valves, may be employed. Any suitable base or standard 7 may be used to support the shells 1 and 2. The shell 2 has an outstanding flange 8 by which it is connected to the shell 1 at the bottom thereof. Beneath the flange 8 is a bottom piece 9 which closes the water-containing shell 2 at the bottom thereof by joining it to the convolute heater 10.

Secured to the bottom plate or piece 9 is a hollow fixed bottom section 11 which may have either a dead air space 12 or the interior may constitute a vacuum. The vacuum or dead air spaces 3 and 12 insulate the water-containing shell 2 from the external air, thereby minimizing loss by radiation.

The convolute heater 10 is composed of heating chambers 13 closed at their tops 14 and separated by water cells or spaces 15 which are open at their upper ends 16. Braces 17 and 18 are provided to hold the heating chambers and water cells rigidly in relation to each other. As best seen in Fig. 3, the convolute heater 10 tapers at the ends of its coil as at 19 and 20.

The fixed bottom section 11 is of substantially annular form having a tapered inner face or margin 21. Fitted snugly into the tapered interior 21 is a hollow removable bottom section 22 having a tapered periphery adapted to fit the surface 21. The section 22 has a flange 23 which overlaps or interlies the section 11. Releasable clamps 24 on either the section 11 or section 22, constitute means for firmly holding the section 22 in position, subject to quick removal when desired. The section 22 is hollow, its interior 25 comprising either a vacuum or a dead air space for purposes of heat insulation. Surmounting the section 22 is a plurality of electrical resistance sections or units 26, 27, 28 which lie in and are secured to insulating blocks or bed pieces 29 fixed to the section 22 so that the bed pieces and the resistance elements are self-contained with and may be bodily removed with the bottom section 22. The resistance units 26, 27, 28 are arranged in convolute form so that they will enter the bottoms of the heating chambers 13. Carried by the bottom section 22 is a trunk conduit 30 having pairs or branches 31 through which the electric conductors pass and are connected to the respective resistance elements 26, 27, 28. For that purpose binding posts 32 may be provided, said posts being carried by the bed pieces 29 and constitute terminals of the electric conductors. The trunk conduit 30 may extend to a convenient position as shown at 30ª for letting in electric conductors from any suitable source.

A valved drain pipe 33 may be provided, leading from the bottom of the shell 2.

In place of the resistance elements 26, 27, 28 I may substitute gas, oil, gasolene, steam, or other burners or heating means which would be self-contained with the section 22 and adapted to be bodily removed with it.

The entire interior, 13, of the convolute heating coil 10 being exposed to the plurality of heating devices 26, 27, 28, heat from each of said devices has access to all parts of the interior of the said device 10. Furthermore, the location of the heating devices 26, 27, 28 in the lower portions of the chambers 13 enables the maximum heating effect to be obtained, as the heat rises in said chambers because the walls of said chambers are in contact, on both sides, with the water contained in the shell 2. The heating means being self-contained with the removable bottom section 22, when the clamps or catches 24 are released they may be quickly removed with the section 22 for purposes of inspection or repair thereto or to enable access to be had to the chambers 13.

Having thus described my invention what I claim as new and desire to secure by Letters Patent is:

1. In a water heater and steam boiler, the combination with inner and outer shells having an intervening heat insulating space or chamber, of a hollow convolute heating device contained within the inner shell and having the opposite surfaces of its coils exposed to the water adapted to be contained in said inner shell.

2. In a water heater and steam boiler, the combination with inner and outer shells having an intervening heat insulating space or chamber, of a hollow convolute heating device contained within the inner shell and having the opposite surfaces of its coils exposed to the water adapted to be contained in said inner shell, and means for introducing heat into the lower parts of the coils of said heating device.

3. In a water heater and steam boiler, the combination with inner and outer shells having an intervening heat insulating space or chamber, of a hollow convolute heating device contained within the inner shell and having the opposite surfaces of its coils exposed to the water adapted to be contained in said inner shell, a removable bottom section, and heating means self-contained therewith adapted to introduce heat into the lower portions of the coils of said heating device.

4. In a water heater and steam boiler, the combination with a shell adapted to contain water, of a hollow convolute heating device whose coils are separated and which is contained within the shell, and means for introducing heat directly into the interior of said convolute heating device.

5. In a water heater and steam boiler, the combination with a shell adapted to contain water, of a hollow convolute heating device whose coils are separated and which is contained within the shell and has an open end portion, and means bodily detachable from the shell, adapted for introducing heat into one end portion of said hollow convolute heating device.

6. In a water heater and steam boiler, the combination with a shell adapted to contain water, of a hollow convolute heating device whose coils are separated and which is contained within the shell and has an open end portion, a removable section, and heating means carried by and removable with said section, positioned so that it is adapted to introduce heat into the open end portion of the coils of said heating device, said removable section constituting a closure for the end portion of said convolute heating device.

7. In a water heater and steam boiler, the combination with a shell adapted to contain water, of a hollow convolute heating device located within the shell and having an open portion, a removable section adapted to constitute a closure for said open portion of said convolute heating device, and electrical resistance means carried by said removable section and positioned so that it faces and lies adjacent the open portion aforesaid, whereby the heat therefrom will enter the convolute heating device.

8. In a water heater and steam boiler, the combination with a shell adapted to contain water, of a hollow convolute heating device located within the shell, a removable section adapted to constitute a closure for an open portion of said convolute heating device, and a plurality of independent electrical resistances carried by and self-contained with said removable section which are positioned to collectively and individually introduce heat into said hollow convolute heating device.

In testimony whereof, I hereunto affix my signature.

MAJOR E. DEARING.